US012786533B2

(12) United States Patent
Kumarasamy et al.

(10) Patent No.: US 12,786,533 B2
(45) Date of Patent: Nov. 3, 2026

(54) MITIGATING ELECTROSTATIC CHARGE ACCUMULATION IN COMPACT CAMERA MODULES

(71) Applicant: Apple Inc., Cupertino, CA (US)

(72) Inventors: Kartthik Kumarasamy, Cupertino, CA (US); Krishna Chaitanya Pokkali, Sunnyvale, CA (US); Hua Deng, San Jose, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 18/641,101

(22) Filed: Apr. 19, 2024

(65) Prior Publication Data

US 2025/0330689 A1 Oct. 23, 2025

(51) Int. Cl.
*H04N 23/52* (2023.01)
*G03B 5/00* (2021.01)

(52) U.S. Cl.
CPC ............... *H04N 23/52* (2023.01); *G03B 5/00* (2013.01); *G03B 2205/0007* (2013.01)

(58) Field of Classification Search
CPC ................................ H04N 23/57; G03B 30/00
USPC ......................................................... 348/374
See application file for complete search history.

(56) References Cited

U.S. PATENT DOCUMENTS

2021/0044727 A1* 2/2021 Sharma .................. H04N 23/55
2024/0012182 A1* 1/2024 Moon ................. H04M 1/0264
2024/0022803 A1* 1/2024 Tseng ................... H04N 23/687

FOREIGN PATENT DOCUMENTS

WO WO-2008092063 A2 * 7/2008 ............... H05K 5/30
WO WO-2012109160 A2 * 8/2012 ............. H02N 1/006

* cited by examiner

*Primary Examiner* — Anthony J Daniels
(74) *Attorney, Agent, or Firm* — Brownstein Hyatt Farber Schreck, LLP

(57) ABSTRACT

A camera module for an electronic device includes an actuator structure for positioning a movable element of the camera module, such as an image sensor or a lens element. The actuator structure is supported within a module housing of the camera module and includes at least one flexure that includes a flexure pad configured and aligned to engage with a corresponding boss extending from the module housing or a carrier supporting the movable element. The flexure pad includes a roughened surface so as to reduce contact area between the boss and the flexure pad.

20 Claims, 11 Drawing Sheets

MITIGATING ELECTROSTATIC CHARGE ACCUMULATION IN COMPACT CAMERA MODULES

TECHNICAL FIELD

Embodiments described herein relate to camera modules for portable electronic devices and, in particular, to selective or general surface treatments for internal components of compact camera modules to reduce electrostatic charge accumulation.

BACKGROUND

A portable electronic device may include a compact camera module for capturing an image. A conventional compact camera module includes an image sensor aligned with a focal plane defined by a lens group. In many cases, one or more lenses of the lens group and/or the image sensor itself may be movable to adjust focus and/or for optical image stabilization.

Over time, however, repeated relative motion of conductors and insulators within the compact camera module cause electrostatic charge accumulation. These electrostatic charges lead to attractive forces that interfere with optical image stabilization movements and/or degrade focus and imaging performance.

SUMMARY

Embodiments described herein can take the form of a compact camera module including: a module housing enclosing an interior volume; a flexure element within the interior volume, the flexure element including a flexure pad having a roughened surface; a movable element within the interior volume including a boss configured to engage with the roughened surface of the flexure pad in response to movement of the movable element; a lens group coupled to the movable element; and an image sensor disposed within the interior volume, the image sensor positioned below the lens. The roughened surface of the flexure pad reduces electrostatic charge accumulation by reducing contact surface area between the boss and the flexure pad.

Certain embodiments described herein can take the form of a compact camera module including: a module housing enclosing an interior volume; a flexure element within the interior volume and with a first roughened surface; a boss disposed within the interior volume having a second roughened surface configured to engage with the first roughened surface of the flexure element; a movable element disposed within the interior volume and coupled to at least one of the flexure element or the boss; and an image sensor disposed within the interior volume, the image sensor positioned below the movable element. As with other embodiments described herein, the roughened surfaces can serve to reduce electrostatic charge accumulation that may otherwise result from interactions between the flexure pad(s) and the boss (es).

Certain further embodiments described herein take the form of a compact camera module including: a module housing enclosing an interior volume; a suspension arrangement with a carrier supporting a lens, the suspension arrangement including (1) a first flexure element within the interior volume and with a first roughened surface, (2) a first boss disposed within the interior volume and configured to engage with the first roughened surface, (3) a second flexure element within the interior volume and with a second roughened surface, (4) a second boss disposed within the interior volume and configured to engage with the second roughened surface; and an image sensor disposed within the interior volume, the image sensor positioned below the lens.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
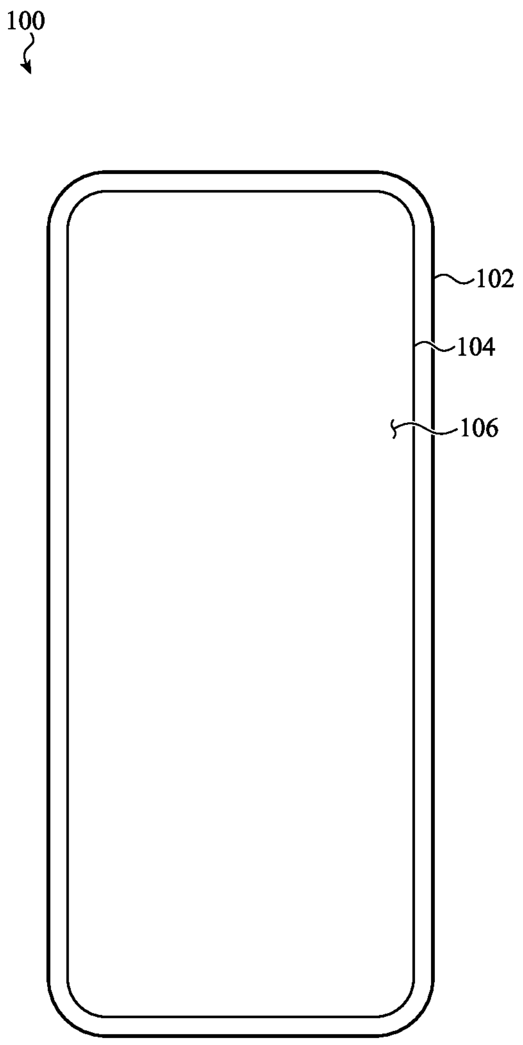
FIG. 1A depicts an example electronic device that can include a camera system and/or camera module, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems for managing electrostatic charge accumulation in compact camera modules configured for electronic devices.

As used herein, the term "compact camera module" and similar phrases refer generally to camera modules suitable for portable electronic devices. In many cases, although not required, a portable electronic device incorporating a camera module or compact camera module as described herein can be a low-profile electronic device or a small form-factor electronic device. Generally and broadly, a compact camera module can occupy a volume on an order of three cubic centimeters or less although a person of skill in the art may readily appreciate that this is neither an upper nor lower limit and that compact camera modules can take many forms.

A camera module as described herein can include one or more movable parts. For example, a compact camera module can include an optical image stabilization system and/or an autofocus system each configured to move a lens or an image sensor.

For example, a camera module as described herein can include one or more coils to physically move one or more movable elements of that camera module relative to other elements of the camera module. Principles of operation may vary from embodiment to embodiment, but in many cases and constructions, a coil may be used to leverage Lorenz force to physically move the coil itself (relative to a magnetic field of a permanent magnet) or another body mechanically coupled to a movable element. In some cases, an image sensor of a camera module may be movable (e.g., translatable in plane, movable in a Z axis, tiltable, and so on). In other cases, one or more lenses of a lens group positioned over an image sensor may be movable. In some constructions, both lenses of a lens group and an image sensor may be movable. For simplicity of description, the embodiments described herein contemplate movable lenses that translate relative to a fixed image sensor, but it is appreciated that this is merely one example construction.

Flexures or other elastic elements can be leveraged to return a movable element to a neutral position. In other words, flexures or elastic elements can oppose movement of the movable elements so as to provide a restoring force to return movable elements to a neutral position. The neutral position can be at any suitable distance from an image sensor, and the distance can vary from embodiment to embodiment. The flexures or other elastic elements (collectively, herein, "flexures") may be formed from metal, plastic, acrylic, or another suitable material exhibiting an elastic property.

In many cases, the flexures can include regions such as pads, arms, fins, bridges, protrusions or other features (collectively, "pads") that are configured and aligned to impact bosses, detents, or end stops (collectively, "end stops") of an interior surface of a housing or enclosure of the compact camera module. These end stops define and constrain motion of the movable element in one or more directions, such as a vertical direction or horizontal direction relative to an imaging axis of the compact camera module.

A compact camera module as described herein can include any suitable number of end stops and corresponding pads defined on one or more flexures. In other cases, flexures as described herein can be fixed in respect of a housing surface of a compact camera module and a carrier element configured for motion can include one or more bosses or end stops. Regardless of construction, it may be appreciated that generally and broadly end stops and flexure pads may, from time to time, come into contact during operation and/or handling of a compact camera module as described herein.

Further to the foregoing, a camera module can include multiple coils for physically moving or relocating multiple movable elements of that camera module, but for simplicity of description and illustration, single coils are described herein. In other cases, other actuators may be used to move elements or components within a camera module. In some cases, multiple actuators of different actuation types or modalities may be used. For simplicity of description, many embodiments that follow presume a voicecoil actuation architecture in which a coil and a permanent magnet interact to move a movable lens or lens group relative to a stationary image sensor, but it may be appreciated this is merely one architecture.

As noted above, a camera module takes a small form factor so as to be incorporable into a portable electronic device. For simplicity of description, implementations in which a camera module is constructed to be incorporated into a portable electronic device are described herein, although it may be appreciated that this is merely one example, and that coils as described herein (and more broadly camera modules as described herein) can take any suitable form factor.

Independent of form factor or actuation type, a camera module as described herein is understood to have at least two surfaces that move relative to one another. In many embodiments, at least one of the surfaces may be an insulating material, such as glass, plastic or acrylic. As known to a person of skill in the art, motion of electrical insulators relative to other materials can result in accumulation of electrical charge. Flexures and end stops are examples of surfaces that may move relative to one another and/or contact one another during manufacturing, shipping, and field operation of a compact camera module as described herein. As a result of such movement, charge can accumulate and introduce unexpected holding forces and/or performance degradations within the compact camera module.

For example, accumulated charge can present an attractive force between charged surfaces and other adjacent surfaces. These attractive forces can interfere with operation of optical image stabilization systems and/or autofocus systems. As charge accumulation increases, the actuation systems associated with optical image stabilization or autofocus may be required to exert a force that opposes the attractive force or exert a force aligned with the attractive force. In both circumstances, resulting motion in movable elements may be unexpected—either too little motion (motion opposes force) or too much motion (motion aligns with force). In these cases, the camera module may operate unexpectedly, from a user perspective. For example, autofocus performance may degrade or slow, and optical image stabilization performance may degrade. In an extreme example, accumulated charge may impart so much attractive force as to render optical image stabilization functionality completely inoperative.

To account for these and other performance degradations associated with accumulated charge, embodiments described herein include flexure pad and/or end stops that are constructed specifically to increase surface roughness and/or to decrease contact surface area of surfaces that contact one another. For example, a flexure pad as described herein can be mechanically, chemically, or otherwise etched with a pattern that increases surface roughness. In these examples, roughened surfaces serve two purposes. First, a rough surface exhibits a smaller contact surface area with other objects when compared to a relatively smoother surface. The smaller contact area reduces the likelihood of accumulation of charge by reducing contact surface area. In addition, a roughened surface may also discharge and/or otherwise neutralize more efficiently than a smooth surface due to surface distribution effects of accumulated charge. As a result, roughened surfaces can prevent accumulation of charge and, additionally, more efficiently reduce and/or distribute charge that may be accumulated.

For example, a flexure of a compact camera module can include multiple pads that are configured and aligned to engage with multiple end stops of another surface or object, such as a lens carrier or module housing that encloses an interior volume. In these examples, the flexures can be globally roughened by, as one example, chemical etching. As a result of global roughening, flexure and end stop interactions may not accumulate electric charge. In other cases, a flexure may be selectively roughened, limited to only the pad surfaces that contact end stops. In these examples, a photolithography operation can be executed to mask the flexure, exposing only a surface of one or more pads. Next, an etching process can be performed and the photolithographic mask can be removed. Chemical etching may be particularly efficient if performed during manufacturing of sheets of flexures, etching dozens if not hundreds of flexure pads at a time.

Chemical etching is one example method of forming a roughened surface. Laser etching, plasma etching, and mechanical etching or processing are other suitable processes that can be performed in other examples. For example, a laser may be used to selectively etch a pattern into a flexure pad surface. Mechanical or laser etching or processing can include, but may not be limited to: sand or other media blasting; scouring; scratching; bending; embossing; debossing; abrasion; ablation; and the like.

In some cases, an etched pattern may be a regular or repeating pattern, in other cases, the pattern may be a random walk. A laser or mechanical etching process can be a global process or a local process in respect of a flexure body.

In yet other examples, a flexure can be stamped to roughen a surface thereof. For example, a corrugated die can be forcibly pressed into the flexure so as to permanently deform an external surface thereof, debossing a pattern therein. In some cases, a surface finish or surface deboss pattern can be molded into a stamp used to form the flexure. In these examples, formation of the flexure itself defines a surface pattern into one or more regions of the flexure.

In yet other examples, a dielectric or antistatic material can be disposed onto a flexure surface or flexure pad surface. In other cases, one or more coatings that cure with a rough surface (e.g., a matte surface finish) can be used. In some cases, material coatings can be applied after etching or processing by another method described herein.

A flexure as described herein may be selectively roughened in many embodiments so as to leave substantially undisturbed the flexure's mechanical and elastic properties; global roughening may augment a flexure's mechanical and/or elastic properties in some cases. In some embodiments, a flexure pad as described herein may be additionally selectively thickened or thinned so as to reduce charge carrying capacity.

As with flexures and flexure pads as described herein, in some embodiments, an end stop can be likewise modified to increase surface roughness and/or to decrease surface contact area. For example, a top surface of an end stop can be debossed such that only a perimeter portion of the end stop engages with a flexure pad. In other cases, a carrier or housing portion defining the end stop can be molded in a manner that imparts a rough surface to the end stop. In yet other embodiments, an end stop surface can be etched as described above in respect of flexures-mechanical etching, laser etching, and/or chemical etching may be suitable to define a roughened surface. Many constructions are possible.

These foregoing and other embodiments are discussed below with reference to FIGS. 1A-6. However, those skilled in the art will readily appreciate that the detailed description given herein with respect to these figures is for explanation only and should not be construed as limiting.

FIG. 1A depicts an example electronic device that can include a camera system and/or camera module, such as described herein. The electronic device 100 may be a portable electronic device, such as a cellular phone, wearable device, laptop, desktop computer, or tablet computing device.

It may be appreciated, however, that a portable electronic device is merely one example device that can include a camera system and/or camera module as described herein. In some cases, the camera module may be incorporated into larger electronic devices such as vehicles (e.g., for security cameras, driver assist, or automated driving purposes), medical or surgical equipment, motion capture devices, and so on.

The electronic device 100 as depicted in FIG. 1A is defined at least in part by a low-profile housing, identified in the figure as the housing 102. The housing 102 can enclose and support one or more components of the electronic device 100, such as a processor, one or more memory components or circuits, a battery, and a display 104.

For simplicity of description and illustration, FIG. 1A is depicted without many of these components. A person of skill in the art may readily appreciate that a number of components, circuits, structures, and systems can be included in the housing 102 of the electronic device 100. For example, the electronic device 100 can include a processor configured to access a memory to instantiate a software application configured to render a graphical user interface 106 via the display 104.

Figure 1B:
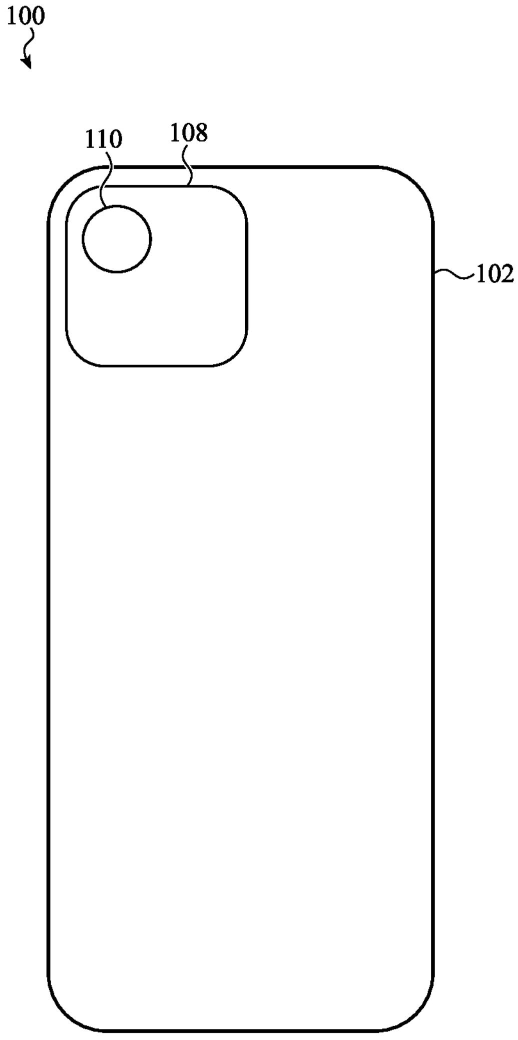
FIG. 1B depicts the example electronic device of FIG. 1A, showing a camera module, such as described herein.

The software application can, in some examples, be configured to integrate with one or more hardware sensors or sensing systems of the electronic device 100, such as a camera module. FIG. 1B depicts the example electronic device of FIG. 1A, showing an imaging system 108. The imaging system 108 can include a protective lens, behind which a compact camera module 110 can be positioned.

In particular, the compact camera module 110 can include an image sensor disposed at an image plane defined by a lens group of the camera module 110. The lens group(s) may define a fixed or variable focal length for the image sensor. For simplicity of description, a single image sensor and lens group are described with reference to the embodiments that follow; it is appreciated that in many cases, the imaging system can include multiple lens groups, multiple image sensor, and so on.

As noted above, a lens group and/or an image sensor may be movable. In many cases, the movable element(s) can include an image sensor and/or one or more lenses of a lens group. For example, an image sensor can be operably coupled to an actuator structure configured to translate the image sensor by a distance in a direction in plane with, or at an angle with respect to, an active imaging area of the image sensor.

In other cases, the actuator structure can be configured to translate the image sensor, in plane, by a first distance in a first direction (e.g., along an X axis), and by a second distance in a second direction (e.g., along a Y axis). In yet other examples, the actuator structure can be configured to translate the image sensor in three directions, for example, X Y and Z axes (e.g., translating out of the X-Y plane).

In other cases, the actuator structure can be configured to pivot about one or more fulcrums so as to change one or more angles describing a relative position between a normal vector of the imaging plane (e.g., in plane with an active imaging area of the image sensor) and a central axis of one or more lenses above the image sensor. For example, the image sensor may be configured, by the actuator structure, to tilt or otherwise rotate relative to a central axis of a lens group. More simply, in some cases lenses can pivot or rotate relative to a normal vector in respect of a positionally-fixed image sensor; in other cases an image sensor can pivot or rotate relative to a normal vector in respect of a positionally-fixed lens group. In yet other cases, both an image sensor and lens groups can move relative to a module housing that encloses an interior housing of a camera module.

As may be appreciated by a person of skill in the art, a movable image sensor may be useful for optical image stabilization purposes. In other cases, movement of an image sensor may be intentionally induced so as to impart a unique imaging effect, such as for tilt-shift photography.

In other cases, one or more lenses may be additionally or alternatively movable by a separate actuator structure to the actuator structure described above. A movable lens may be configurable to pivot, translate in plane, translate out of plane, rotate, and so on.

An actuator structure as described herein typically includes at least one coil that leverages the Lorenz force to physically move itself relative to a permanent magnet or, in some constructions, to move a magnet relative to itself. In other cases, leveraging the Lorenz force may not be required of a particular design or implementation; a coil may be used as a solenoid to attract or repel a ferromagnetic or diamagnetic material. In many cases, an actuator structure can include multiple coils. For example, three coils may be used to control three degrees of freedom of a movable image sensor.

An "actuator structure," as referenced herein, can be operably and/or conductively coupled to an actuator controller which may be implemented as an application specific integrated circuit within a camera module, such as the imaging system 108. In some embodiments, the actuator controller may be operably coupled to an instance of firmware instantiated by cooperation of a processor and memory of the imaging system 108.

The actuator controller may receive instructions and/or signals from the instance of firmware and/or from the processor directly, to apply a voltage or current to one or more coils in order to change a physical position of a movable element of the imaging system 108 (such as a lens or the image sensor).

For example, in some cases, a particular magnitude of current may be circulated through a specified coil that is, itself, within a magnetic field originating from a permanent magnet nearby in order to induce a Lorenz force of known magnitude to cause the coil (and elements physically coupled to the coil) to move in a particular direction. More simply, the actuator controller may receive one or more instructions to move a movable element in a particular direction for a particular distance and/or to a particular angle. The instruction can correspond to a particular actuation current that, after calibration (either during manufacturing or in the field), is associated with a particular movement. More specifically, particular current or particular voltage can be presumed by the imaging system 108 to move a particular moveable element to a specific location, in a particular amount of time.

In some cases, the actuator controller can receive a voltage signal or current signal having a magnitude, pulse width, phase, and/or frequency that correlates to a desired output direction, magnitude and/or direction of movement. In other cases, the actuator controller can be configured to receive a digital value corresponding to the same.

In some cases, the actuator controller can be coupled to and/or may include a memory storing a lookup table that correlates particular movements of a movable element to particular currents or voltages applied to particular coils of a particular, given, camera module-such as the imaging system 108. Many constructions are possible.

In some cases, the actuator controller can be configured to receive as input an output provided by an accelerometer or gyroscope. This output can be inverted, scaled, and converted to a movement instruction executed by the actuator controller to cause an associated actuator structure to move a movable element, such as an imaging sensor or lens element.

In further embodiments, an actuator controller as described herein may be communicably and/or operably coupled to one or more instances of software executing over a processor disposed within the housing 102 of the electronic device 100. For example, in some embodiments, a software application instance instantiated over a processor and/or memory of the electronic device 100 can leverage the display 104 to generate a user interface with which a user of the electronic device 100 can interact. In some examples, the software application may be an imaging application, such as a camera control application.

The camera control application can present one or more user interface elements via the display 104 which may be selected by a user. In some cases, one of the user interface elements can be used by a user of the electronic device 100 to control a relative position of a movable element, such as to control a focal point, a focal length, an alignment between the image sensor and a central axis defined by a lens group, and so on.

In other words, in some cases, the user interface may receive a signal or other input from a user including an instruction to cause an actuator controller to select and/or apply an appropriate signal as input to an actuator structure, and in particular, to a coil of an actuator structure to cause the coil to generate a magnetic field of particular orientation and magnitude, thereby inducing a movement.

However, as noted above, movement over time of the movable elements of the imaging system 108 can result in accumulation of electrostatic charge, such as between flexures and end stops of the compact camera module 110. These charges can be associated with undesirable forces of attraction between a charged surface and other surfaces within the compact camera module 110.

For example, as noted above, an electrostatically charged surface may oppose movement induced by the actuator controller. In other cases, electrostatically charged surfaces may add to movement induced by the actuator controller. In either case, movement of a movable element (e.g., image sensor, lens element, and so on) may not be to an expected location—it may move too little or too much, resulting in an undesirable behavior of the compact camera module 110 and imaging system 108.

To mitigate electrostatic attraction and charge accumulation, embodiments described herein relate to surface treatments and/or surface patterning that reduce contact area between interfacing movable surfaces. Specifically, surfaces of flexures and/or end stops may be roughened or otherwise textured to decrease contact area therebetween.

These foregoing embodiments depicted in FIGS. 1A-1B and the various alternatives thereof and variations thereto are presented, generally, for purposes of explanation, and to facilitate an understanding of various configurations and constructions of a portable electronic device that can incorporate a camera module, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
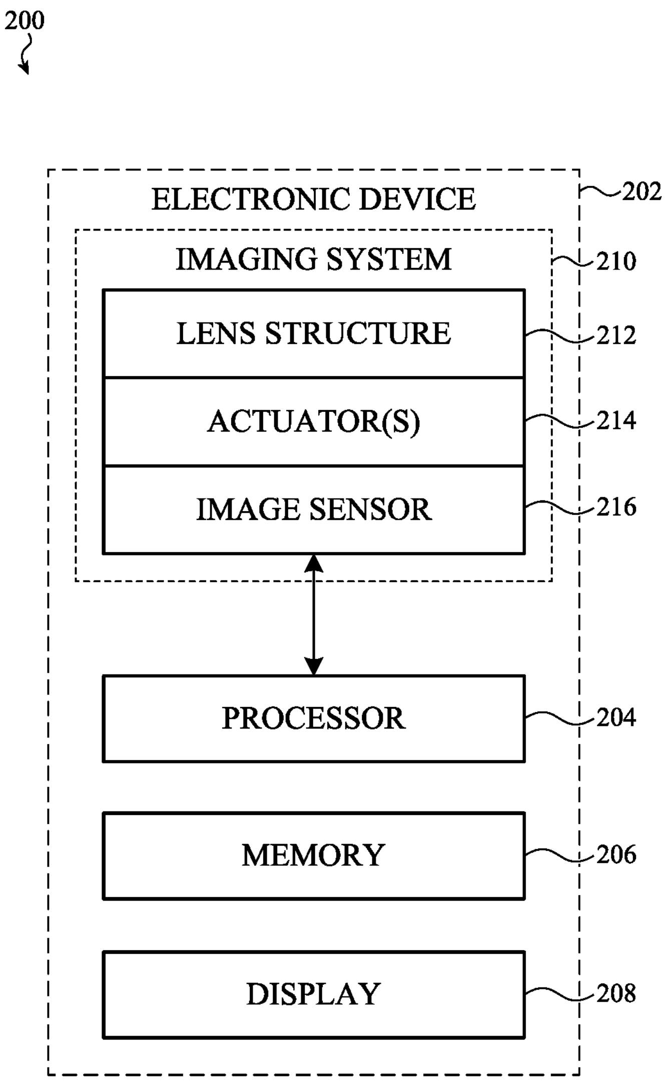
FIG. 2 is a simplified system diagram of an electronic device as described herein.

For example, more generally and broadly, it may be appreciated that any suitable electronic device can include a camera module as described herein. FIG. 2 is a simplified system diagram of such an example electronic device that can include a camera module with at least one actuator, as described herein.

For example, an electronic device that can include a camera system and/or camera module as described herein can be implemented as an example electronic device, identified in FIG. 2 as the electronic device 200.

The electronic device 200 can include a housing 202 that encloses and supports a processor 204, a memory 206, and (optionally) a display 208. As noted with respect to other embodiments described herein, the processor 204 can be configured to access the memory 206 to retrieve one or more computer-executable instructions and/or other executable assets in order to instantiate one or more instances of software that, in turn, may perform or coordinate one or more operations performed by the processor 204.

The instance of software can operate with or without user input. In some cases, the instance of software can be configured to operate as firmware of an application specific integrated circuit disposed within and/or shipped within a camera module such a described herein. In other cases, the software instance can be instantiated over a processor or coprocessor of an electronic device, such as the electronic device 200

For example, in some embodiments, the electronic device 200 can leverage the processor 204 and the memory 206 to instantiate an instance of a photography software application. The photography software application instance can be configured to access and/or communicably couple to a camera module 210 of the electronic device 200.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, the term "memory" refers to any software and/or hardware-implemented data processing device or circuit physically and/or structurally configured to define a temporary or durable (e.g., volatile or nonvolatile) storage media configured to store one or more data structures or files and so on, regardless of media type (e.g., optical, magnetic, electric, photonic, and so on).

The camera module 210, which can be disposed within its own module housing (not identified in the figure) that defines an interior volume to enclose, support, and/or protect a lens structure 212, an actuator structure 214, and an image sensor 216. The lens structure 212 can be configured to receive and focus light from a scene external to the electronic device 200 that may be imaged by the image sensor 216.

The lens structure 212 can include any suitable number of optical elements configured to modify a phase or direction of light passing therethrough. The lens structure 212 can include one or more movable or fixed concave or convex lenses; the configuration and/or position of the lenses of the lens structure 212 can vary from embodiment to embodiment and may be controlled at least in part by the actuator structure 214. The lens structure 212 can define an imaging axis that may align with a normal vector normal to a planar surface of the image sensor 216, the imaging surface. In other cases, the imaging axis may reflect from one or more reflective surfaces such as in a periscopic lens configuration.

In some cases, the lens structure 212 can also include one or more filters configured to exhibit selected reflectance and/or transmittance for particular bands of light. For example, the lens structure 212 can include an infrared cut filter configured to reflect infrared light away from the image sensor 216. In other cases, an infrared cut filter may be configured to absorb infrared light. In yet other cases, the lens structure 212 can include one or more color filters configured to reflect particular colors of light. In yet other cases, the lens structure 212 can include one or more reflective surfaces, such as mirrors or beam splitters configured to redirect a path of light as it passes through the lens structure 212. For example, in some constructions the camera module 210 can be implemented with a periscopic lens structure.

These forgoing examples are not exhaustive of the types or arrangements of optical elements that can be leveraged by a camera module, such as described herein. In particular, it may be appreciated by a person of skill in the art that the lens structure 212 can include any number of suitable optical elements, arranged in any suitable order, for any particular embodiment. Further, as noted above, in some cases, the actuator structure 214 can be configured to move the image sensor 216 itself.

As noted above, the actuator structure 214 can be configured to move the image sensor 216 and/or one or more elements of the lens structure 212. In some embodiments, the actuator structure 214 can include multiple actuators each configured to move or reposition different portions of the camera module 210. Any one of these movements may result in the shifting of insulating materials or surfaces relative to other insulating or conductive surfaces which, in turn, can result in the accumulation of charge (e.g., flexures and lens carriers, which can include end stop protrusion aligned to interact with corresponding pads of the flexure). In addition, ordinary motion of a camera module and/or an electronic device incorporating it can result in charge accumulation. The accumulation of charge, as noted above, can result in suboptimal or unexpected lens positioning and/or retention of dust particles on surfaces intersecting the imaging axis.

These foregoing embodiments depicted in FIGS. 1A-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
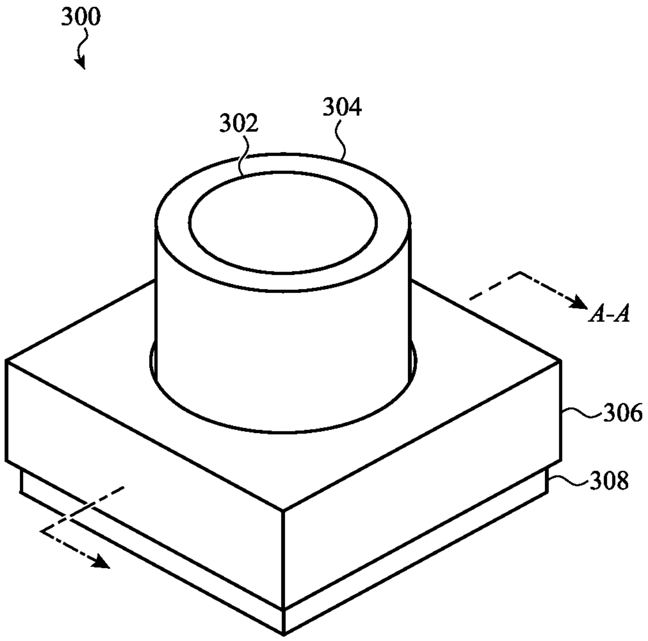
FIG. 3 depicts an isometric view of an example camera module as described herein.

A camera module as described herein can be implemented in a number of suitable ways, and may take a number of suitable form factors. In many examples, as noted above, a camera module can take a small form factor suitable for inclusion within a housing of a low-profile electronic device such as a cellular phone. FIG. 3 depicts such a configuration, although it may be appreciated that this is merely one example construction.

The camera module 300 can include one or more lens elements or groups that cooperate to define a focal plane aligned with an active imaging area of an image sensor. As with other embodiments described herein, one or more elements of the camera module 300 can be movable.

To facilitate movement of one or more elements of the camera module (e.g., lenses, image sensor, and so on), flexible circuit boards may be used to accommodate and support functional electronics associated with the camera module 300.

In general, the flex circuit may include a plurality of planar segments that are connected via one or more bends. The flex circuit may be fixed relative to the image sensor, and may be positioned within the camera such that movement of the image sensor (or other movable elements) along a first direction causes twisting in one or more of the plurality of segments.

This twisting may allow the flex circuit to accommodate the movement of the image sensor along the first direction while itself having a negligible impact on the overall volume of the camera module 300, and specifically, overall volume of a module enclosure of the camera module 300. In certain constructions, the twisting or other deflection of the flex circuit can provide a return force to return the image sensor and/or other movable element to a nominal position.

FIG. 3 depicts an isometric view of a camera module 300. The camera module 300 may include the flex circuit, an image sensor, lens, an actuator assembly, a module enclosure, one or more flexures, one or more end stops aligned with the one or more flexures, and other components.

In particular the camera module 300 includes a lens group 302 enclosed within a barrel 304 positioned within an apertured defined by a baffle 306, which may also be referred to as an upper housing part or an upper enclosure part. The baffle 306 can be coupled to a lower housing part 308, also referred to as a shield can. The baffle 306 and the lower housing part 308 cooperate to define a module housing for the camera module 300. The baffle 306 and the lower housing part 308 can be formed from metal, but this is not required of all embodiments. These parts may be welded, friction fit, riveted, or otherwise adhered (e.g., conductive epoxy, such as silver epoxy) to one another during assembly of the camera module 300.

More generally, the module enclosure may be configured to at least partially enclose the various components of the camera module 300, and in some variations may act to shield internal camera components from interference as well as to shield other components or devices external to the housing from electromagnetic interference originating within the camera module 300.

The lens group 302 includes one or more lens elements configured to direct light received by the camera toward an image sensor of the camera module 300. In some instances, the camera module 300 may be configured to have a folded optics arrangement, where the camera module 300 further includes one or more mirrors or prisms to redirect the light captured by the camera. It should be appreciated that in a folded optics arrangement, the optical axis of the lens group 302 and camera module 300 may extend along multiple directions (e.g., a light folding element such as a prism or mirror may change the direction of the optical axis).

For simplicity, the "optical axis" of a camera module is a portion of an optical axis of a lens, as light exits the lens and propagates toward an image sensor. The optical axis of an image sensor is considered to be a vector normal to a plane of an active image area of the image sensor; the normal vector is typically parallel to the optical axis. In folded optics arrangements, the optical axis may reflect once or more before intersecting the imaging area of an image sensor.

The camera module 300 can include a carrier configured to move in one or more directions. The carrier can be mechanically coupled to an image sensor such that repositioning of the carrier respectively causes repositioning of the image sensor.

In the illustrated construction, the image sensor may receive light through the lens group 302, and may generate one or more signals that may convey information about the light received during imaging (which are conveyed off the image sensor via a flex circuit). The image sensor may be any suitable sensor, such as a CCD, CMOS sensor, or the like. In some cases, the lens group 302, or a portion thereof, may be configured to move within the camera, by operation of an actuator assembly configured to move the carrier.

As mentioned above, the image sensor (and/or portions of the lens group 302) may be configured to move within the camera (e.g., relative to at least the module enclosure defined by the baffle 306 and the lower housing part 308). For example, the image sensor may be moved relative to the lens group 302 along the optical axis of the camera module 300 to adjust the camera's focus, which may allow the camera module 300 to provide autofocus. Additionally or alternatively, the image sensor may be moved relative to the lens in one or more directions perpendicular to or otherwise not aligned with the optical axis of the camera module 300, which may allow the camera module 300 to provide optical image stabilization capabilities.

It should be appreciated that the cameras described may be configured to perform both autofocus and optical image stabilization, or it may be configured to perform only one of these operations. Furthermore, in some instances, the camera module 300 may be further configured to adjust the position or optical power of the lens group 302 to assist with autofocus and/or optical image stabilization operations. This may be achieved by moving one or more lens elements of the lens group 302 relative to the image sensor. Additionally or alternatively, the lens group 302 may comprise a variable focus lens element (e.g., a liquid lens), which may be actuated to adjust the optical power and/or optical axis of the lens element.

Autofocus and optical image stabilization operations may be performed by any suitable combination of positional adjustments of the image sensor and/or the lens group 302. With reference to FIG. 1B, the camera module 300 may further comprise an actuator assembly configured to move the image sensor within the camera module 300.

The actuator assembly includes an actuator and is coupled to the carrier, which may be more generally referred to as a suspension arrangement. The actuator can be configured to generate forces needed to move the image sensor, and may comprise a voice coil motor, a comb drive, or the like. In other cases, other mechanical couplings may be used for an actuator assembly such as described herein; suspension is not required of all embodiments. In some cases, as one example, bearings may be used.

In embodiments where the actuator includes a voice coil motor, the voice coil motor may comprise a magnet and a coil, one of which may be fixed relative to the image sensor (either via a direct connection to the image sensor, or via indirect connection via one or more intervening components or support structures) and the other of which may be fixed within the camera in a manner that allows the image sensor to move relative thereto.

The coil may be positioned within the magnetic field of the magnet such that when current is driven through the coil, a Lorentz force induces a change in relative position of the coil and magnet, which in turn may displace, tilt, translate, or rotate the image sensor within the camera module 300.

It should be appreciated that some embodiments may include an actuator with a plurality of voice coil motors, each of which may be used to generate Lorentz forces as discussed above. The suspension arrangement may be configured to suspend the image sensor (as well as one or more other components connected thereto) within the camera module 300, and may allow the image sensor to move within camera module 300 along one or more directions, angles, and/or within one or more planes or axes of rotation.

The suspension arrangement may comprise one or more suspension elements, such as flexures (e.g., leaf springs, suspension wires, flexure arms, and so on) and/or one or more bearings, and so on. In instances where the suspension arrangement includes one or more flexures, the flexures may provide a moveable connection between the image sensor (for example, via a holding structure that carries the image sensor such as a "carrier") and one or more additional structures in the camera.

In instances in which the suspension arrangement includes one or more bearings, the bearings may be positioned between the image sensor (e.g., via a holding structure that carries the image sensor) and one or more additional structures in the camera, and may guide image sensor movement.

These foregoing embodiments depicted in FIGS. 1-3 and the various alternatives thereof and variations thereto are presented, generally, for purposes of explanation, and to facilitate an understanding of various configurations and constructions of a compact camera module, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

FIGS. 4A-4E depict a simplified cross-section view taken through line A-A of FIG. 3, depicting movement of internal components of a compact camera module as described herein.

The camera module 400 depicted in cross section in FIGS. 4A-4E is simplified to emphasize possible interactions between flexure members, carriers, and end stops or bosses as described herein. A person of skill in the art may readily appreciate that certain components of a camera module are omitted from these figures for simplicity of description and illustration.

The camera module 400 includes a movable element 402 that can include one or more lenses, one or more lens groups, one or more carriers, and/or one or more image sensors. Broadly, the movable element 402 can be any suitable element or combination of elements configured to displace, rotate, tilt, or otherwise shift in response to actuation of an actuator as described herein.

The movable element 402 can be configured to move relative to a module housing of the camera module 400. In particular, the module housing can be a multi-part housing including an upper module housing part 404 and a lower module housing part 406. The upper module housing part 404 and the lower module housing part 406 can be formed from metal or another suitable material. The upper module housing part 404 and the lower module housing part 406 can be permanently or removably coupled to one another to define the module housing of the camera module 400.

Figure 4A:
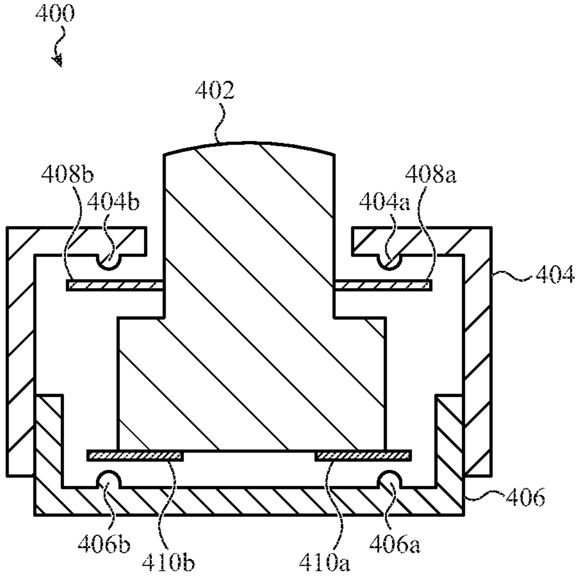
FIGS. 4A-4E depict simplified cross-section views taken through line A-A of FIG. 3, depicting movement of internal components of a compact camera module as described herein.

The upper module housing part 404 defines an aperture through which the movable element 402 can extend. In the illustrated example shown in FIG. 4A, the movable element 402 includes a lens portion that includes a barrel that extends through a circular aperture defined through the upper module housing part 404. Although FIG. 4A is rendered with space separating the movable element 402 and sidewalls of the aperture defined through the upper module housing part 404, it may be appreciated that such a construction is not required of all embodiments. For example, a barrel may be coupled to the upper module housing part 404 and the movable element 402 may be configured to move and/or translate within the barrel. In other cases, a bushing, seal, or other filler material may be disposed to close any gap between the upper module housing part 404 and the movable element 402 (or a stationary component such as a barrel in which the movable element 402 is disposed).

The movable element 402 can be suspended by one or more suspension structures that can include one or more flexures, such as the upper flexure 408 and the lower flexure 410. In the illustrated cross section, the upper flexure 408 can include an upper flexure portion 408*a* and an upper flexure portion 408*b* and, likewise the lower flexure 410 can include a lower flexure portion 410*a* and a lower flexure portion 410*b*.

The flexure portions can be configured with one or more pads configured to engage with corresponding protrusions extending from interior surfaces of the module housing of the camera module 400. For example, the upper flexure portion 408*a* can be aligned with and configured to engage/interface with a boss 404*a* extending from an interior surface of the upper module housing part 404. Similarly, the upper flexure portion 408*b* can be aligned with and configured to engage/interface with a boss 404*b* extending from a different interior surface of the upper module housing part 404.

Likewise the lower flexure 410 can include multiple bosses that are correspondingly aligned with flexure pads of the lower flexure 410. Specifically, the lower flexure portion 410*a* can be aligned with and configured to engage with a boss 406*a* and the lower flexure portion 410*b* can be aligned with and configured to engage with a boss 406*b*.

Figure 4B:
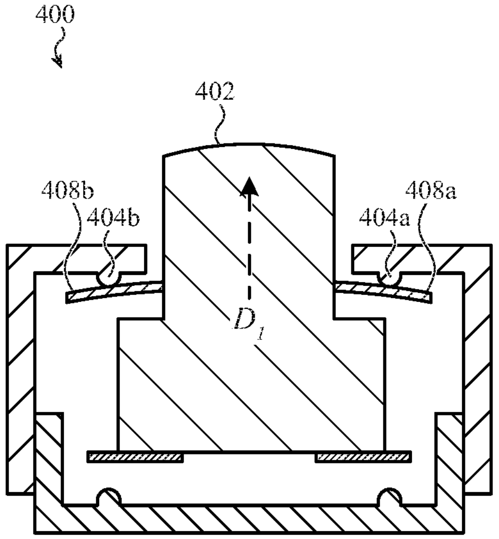

As a result of the depicted construction, motion of the movable element 402 (e.g., in response to action of an actuator, such as described above) can be constrained. More specifically, as the movable element 402 moves or is otherwise displaced, the flexures and bosses can interact to apply mechanical resistance defining end stops for the movable element 402. For example, a displacement D1 as shown in FIG. 4B can result in interaction of the boss 404*a* with the upper flexure portion 408*a* and the boss 404*b* with the upper flexure portion 408*b*. In this example, the upper flexure portion 408*a* and the upper flexure portion 408*b* deflect when contacting the bosses 404*a* and 404*b*, respectively, to resist further displacement of the movable element 402 along the direction D1.

Figure 4C:
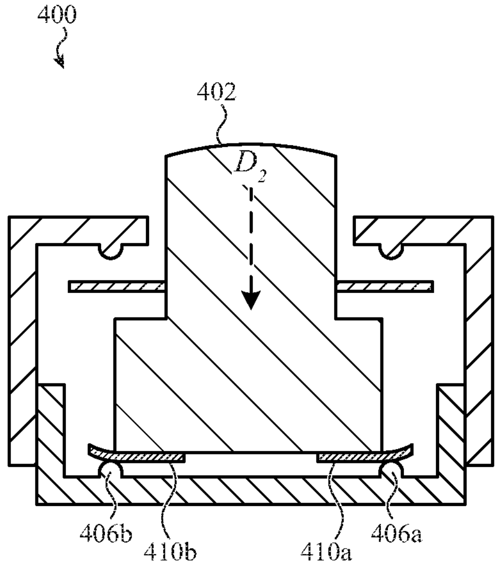
Figure 4D:
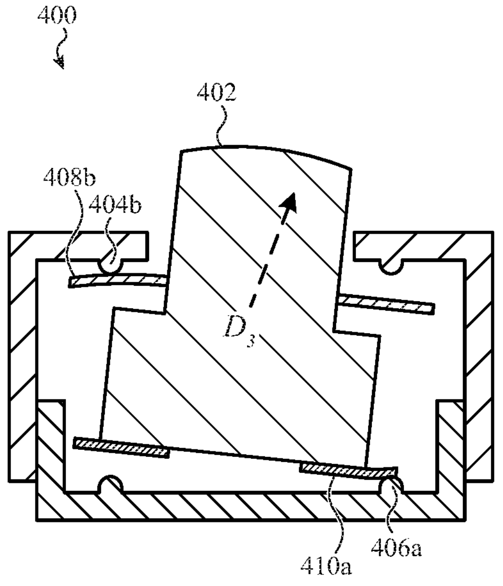

Similarly, a displacement D2 as shown in FIG. 4C can result in interaction of the boss 406*a* with the lower flexure portion 410*a* and the boss 406*b* with the lower flexure portion 410*b*. In this example, the lower flexure portion 410*a* and the lower flexure portion 410*b* deflect when contacting the bosses 406*a* and 406*b*, respectively, to resist further displacement of the movable element 402 along the direction D2. In the case of tilt, as shown in FIG. 4D, opposite pairs of flexure pads and bosses may interact. For example, displacement D3 shown in FIG. 4D depicts the upper flexure portion 408*b* engaging with the boss 404*b* while the lower flexure portion 410*a* engages with the boss 406*a*.

These foregoing embodiments depicted in FIGS. 4A-4D and the various alternatives thereof and variations thereto are presented, generally, for purposes of explanation, and to facilitate an understanding of various modalities through which a flexure can impact a surface or surface feature such as a boss, as described herein. However, it will be apparent to one skilled in the art that some of the specific details presented herein may not be required in order to practice a particular described embodiment, or an equivalent thereof.

Figure 4E:
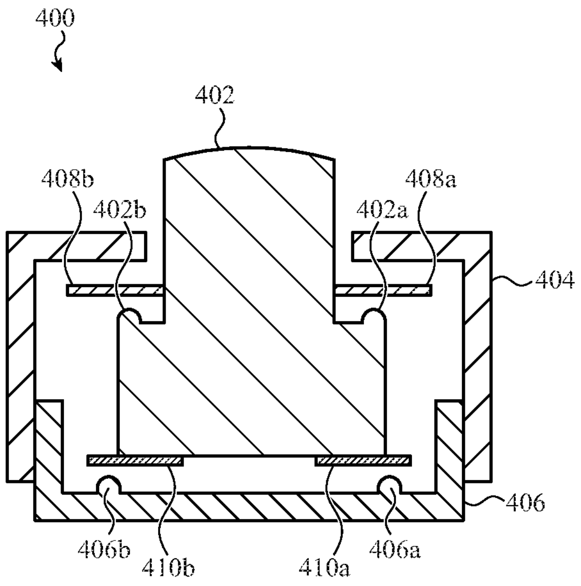

However, as noted above, the depicted construction shown in FIGS. 4A-4D are simplified. It may be appreciated that bosses and flexures can be positioned elsewhere but may interact from time to time in substantially the same manner. For example, as shown in FIG. 4E, in some cases the movable element 402 can include one or more bosses, such as the boss 402*a* or the boss 402*b* that may be configured to engage with corresponding portions (e.g., flexure pads) of the upper flexure 408. Specifically, the boss 402*a* may be configured to engage with the upper flexure portion 408*a* and the boss 402*b* may be configured to engage with the upper flexure portion 408*b*.

As noted above, regardless of whether a boss or flexure is mechanically coupled to a carrier, movable element, or a module housing of a compact camera module as described herein, operation of autofocus and/or optical image stabilization systems of the camera module can result in accumulation of electrostatic charge. To mitigate this effect, embodiments described herein can selectively roughen surfaces of flexure pads and/or surfaces of bosses so as to reduce contact area therebetween.

Figure 5A:
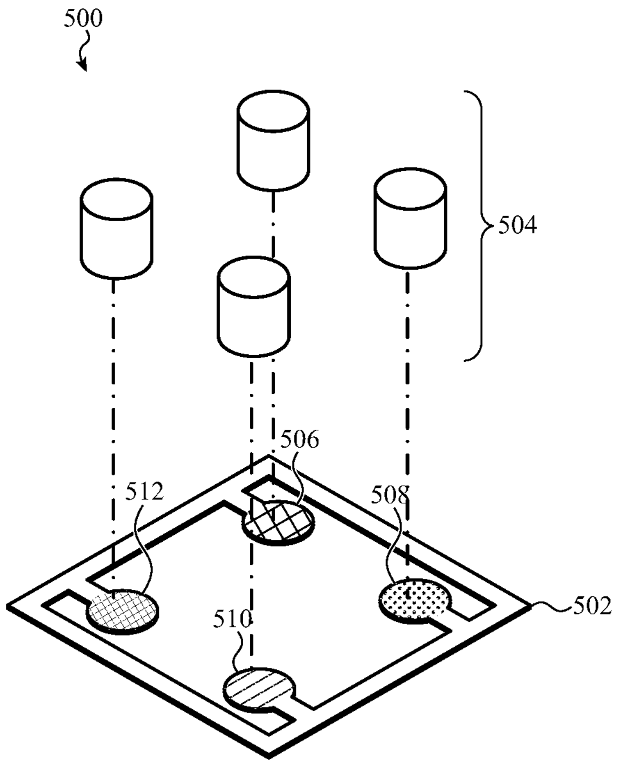
FIGS. 5A-5B depict isometric views of a simplified example flexure and corresponding end stop bosses that may have local (or global) surface treatments that mitigate accumulation of electrostatic charge within a compact camera module as described herein.
Figure 5B:
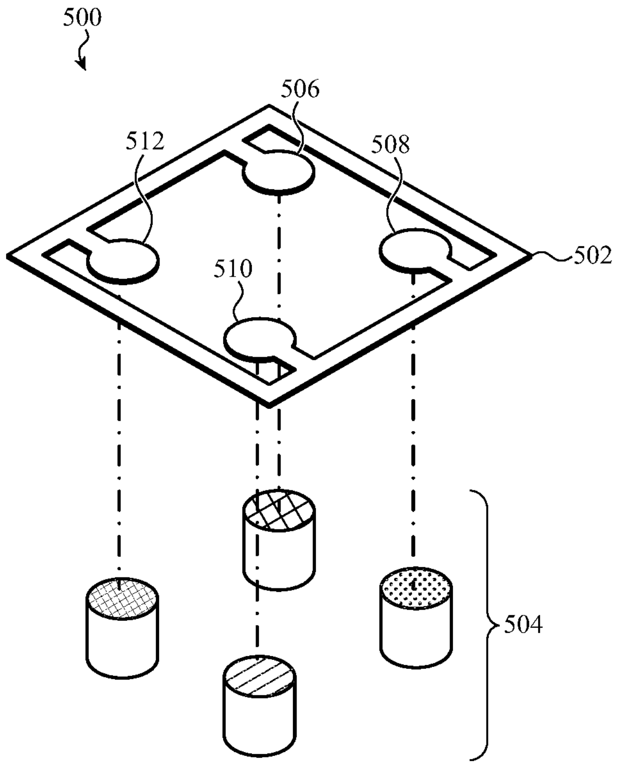

FIGS. 5A-5B depict isometric views of a simplified example flexure and corresponding end stop bosses that may have local (or global) surface treatments that mitigate accumulation of electrostatic charge within a compact camera module as described herein.

FIG. 5A a view 500 including a simplified flexure 502 positioned relative to a set of bosses 504. In this embodiment, the simplified flexure 502 includes a flexure pad 506 that can include a surface texture different from other portions of the simplified flexure 502. For example, the flexure pad 506 can be textured by mechanical etching, laser etching, plasma etching, brushing, scoring, scouring, imprinting, grinding, media blasting, brushing or other machining operations. In other cases, the flexure pad 506 can be etched in a chemical process. The flexure pad 506, as described above can be etched so as to introduce a particular average surface roughness that exceeds that of other portions of the simplified flexure 502.

In this manner, and as a result of the surface roughness/texture introduced to the flexure pad 506, when the flexure pad 506 engages with a corresponding boss of the set of bosses 504, a smaller physical contact area engages between the elements, thereby reducing chances of electrostatic charge accumulation.

In some embodiments, a flexure includes only a single flexure pad. In other cases, a flexure as described herein includes multiple flexure pads. In FIG. 5A, four separate flexure pads are depicted. More specifically, the simplified flexure 502 includes the flexure pad 506, the flexure pad 508, the flexure pad 510, and then the flexure pad 512. Each flexure pad can be configured to, and aligned to, engage with a corresponding boss of the set of bosses 504.

In many cases, texturing of all flexure pads of a flexure as described herein is the same. In other words, the same pattern can be defined onto all flexures. In other cases, such as depicted, different textures can be formed onto different flexure pads. Some textures may be patterned, some textures may be random, some textures may include different subregions with different surface finishes or textures (e.g., a checkerboard pattern, spiral pattern, and so on). Many constructions are possible. In yet other examples, such as shown in FIG. 5B, the bosses of the set of bosses 504 can be textured.

In some cases, both flexure pads and corresponding bosses can be textured/patterned as described herein. In other cases, only one or the other may be textured as described herein. In some cases, bosses may have a reduced thickness and/or diameter in order to further reduce contact surface area. In some cases, bosses as described herein can be formed with a recess, detent, or cavity such that only a perimeter portion of each boss contacts respective portions of corresponding flexure pads.

The foregoing embodiments depicted in FIGS. 5A-5B and the various alternatives thereof and variations thereto are presented, generally, for purposes of explanation, and to facilitate an understanding of various configurations and constructions of a boss and flexure pair that can be textured, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, although depicted in FIG. 5A and FIG. 5B as locally textured (e.g., only over pad regions of the flexure), it may be appreciated that this is merely one example. In other cases, an entire surface of the flexure can be textured. The surface may be globally textured with the same pattern and/or surface finish or may have different regions with different surface finishes. In some cases, in lieu of and/or in addition to a textured surface, flexure pads and/or bosses can include a material or layer disposed over a surface thereof. In other cases, macro scale adjustments may be made to boss or flexure structures as described herein to reduce contact surface area.

Figure 5C:
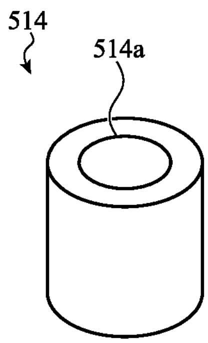
FIGS. 5C-5E each depict isometric views of simplified end stop bosses that can include surface features that reduce contact area.

FIG. 5C, as an example, depicts a boss 514 that includes a recessed portion 514*a*. The recessed portion 514*a* can be a cavity, a detent, a debossed feature, or the like. In this example, the boss 514 exhibits a smaller contact surface area than a like-diameter boss of solid construction. In this example, a top surface of the boss 514 can be textured as described herein by mechanical, laser, plasma, or chemical etching or processing. In other cases, a material can be disposed over the boss 514 so as to increase the roughness of the top ring-shaped surface. Many constructions are possible.

Figure 5D:
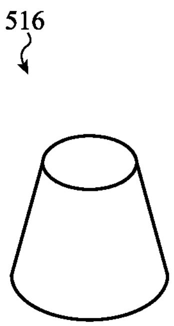

FIG. 5D depicts a boss 516 taking a conical shape, with a smaller upper surface than a base surface. The boss 516 thus can exhibit a smaller contact surface area than a consistent-diameter boss. As with prior embodiments, a top surface of the boss 516 can be textured as described herein by mechanical, laser, plasma, or chemical etching or processing. In other cases, a material can be disposed over the boss 516 so as to increase the roughness of the upper surface. Many constructions are possible.

Figure 5E:
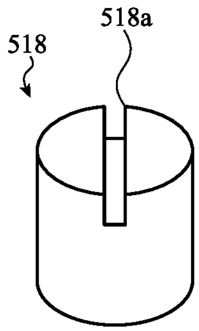

FIG. 5E depicts a boss 518 having a slot, cutout, or other macro surface discontinuity. In this manner as with other embodiments described herein, the boss 518 can exhibit a smaller contact surface area than a boss with a continuous surface. As with prior embodiments, a top surface of the boss 516 can be textured as described herein by mechanical, laser, plasma, or chemical etching or processing. In other cases, a material can be disposed over the boss 518 so as to increase the roughness of the upper surface. Many constructions are possible.

These foregoing embodiments depicted in FIGS. 5A-5E and the various alternatives thereof and variations thereto are presented, generally, for purposes of explanation, and to facilitate an understanding of various configurations and constructions of a boss and flexure pair that can be textured, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example in some cases, a boss or flexure may, without limitation: include one or more perforations or through-holes; be formed from multiple materials or material types; may be electrically grounded or coupled to other conductive elements of a module enclosure; may be doped with one or more conductive materials or elements; may be layered with multiple conductive or nonconductive elements; and so on. In many cases, boss or flexure surface or contact area treatments can be localized thereto, but this is not required. In other cases, global material or surface finish modifications can be implemented.

Figure 6:
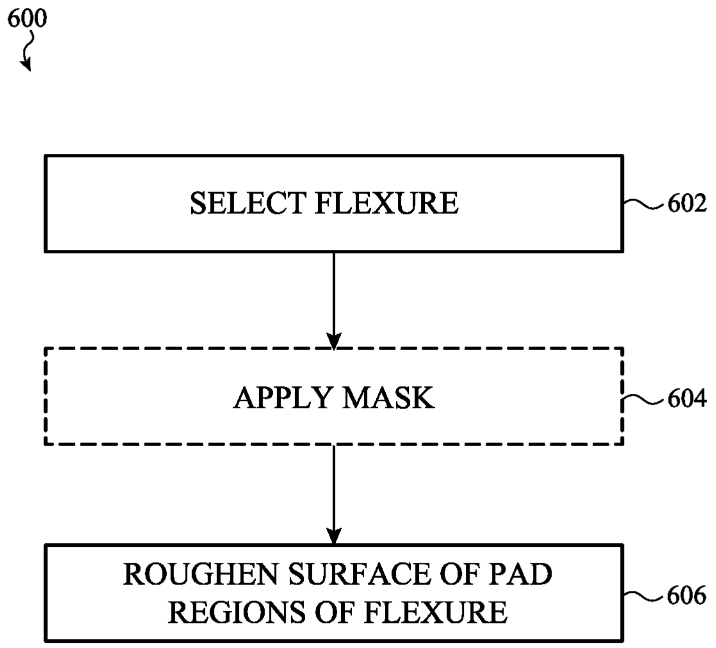
FIG. 6 is a flowchart depicting example operations of a method of applying surface treatments to components of a compact camera module, as described herein.

FIG. 6 is a flowchart depicting example operations of a method of applying surface treatments to components of a compact camera module, as described herein. The method 600 included operation 602 at which a flexure is selected. The flexure may be a flexure group (such as a pre-singulation stamp sheet) or may be a single flexure. Thereafter, at operation 604, a mask may be optionally disposed over the selected flexure. The mask may be applied over all portions of the flexure, exposing only specific regions such as regions configured to engage with respective end stops or boss features of housing modules, carriers, or other structural components of a compact camera module as described herein. Finally at operation 606, the masked flexure can be roughened in a suitable process which can include mechanical, plasma, laser, chemical or other etching or processing.

These foregoing embodiments depicted in FIG. 6 and the various alternatives thereof and variations thereto are presented, generally, for purposes of explanation, and to facilitate an understanding of various methods of operating a camera module, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of some embodiments, whether or not such embodiments are described and whether or not such features are presented as being a part of a described embodiment. Thus, the breadth and scope of the present description should not be limited by any of the above-described exemplary embodiments but is instead defined by the claims herein presented.

What is claimed is:

1. A compact camera module comprising:
- a module housing enclosing an interior volume;
- a flexure element within the interior volume and comprising a flexure pad having a continuous roughened surface;
- a movable element within the interior volume comprising a boss configured to engage with the continuous roughened surface of the flexure pad in response to movement of the movable element;
- a lens group coupled to the movable element; and
- an image sensor disposed within the interior volume, the image sensor positioned below the lens group.

2. The compact camera module of claim 1, wherein the continuous roughened surface is an etched surface.

3. The compact camera module of claim 2, wherein the etched surface is formed by mechanical, plasma, laser, or chemical etching.

4. The compact camera module of claim 1, wherein the continuous roughened surface comprises a debossed feature.

5. The compact camera module of claim 1, wherein:
- the continuous roughened surface is a first roughened surface; and
- the boss comprises a second roughened surface, the second roughened surface configured to engage with the first roughened surface upon movement of the movable element.

6. The compact camera module of claim 5, wherein the second roughened surface is an etched surface.

7. The compact camera module of claim 5, wherein the second roughened surface comprises a debossed feature.

8. The compact camera module of claim 5, wherein the second roughened surface comprises an etched pattern.

9. The compact camera module of claim 5, wherein the boss extends from a surface of a carrier coupled to the lens group.

10. The compact camera module of claim 9, wherein the carrier is formed from an insulating material and the flexure pad is formed from a conductive material.

11. The compact camera module of claim 10, wherein the flexure element is formed from metal.

12. A compact camera module comprising:
- a module housing enclosing an interior volume;
- a flexure element within the interior volume and comprising a first roughened surface, wherein the first roughened surface is continuous;
- a boss disposed within the interior volume and comprising a second roughened surface configured to engage with the first roughened surface;
- a movable element disposed within the interior volume and coupled to at least one of the flexure element or the boss; and
- an image sensor disposed within the interior volume, the image sensor positioned below the movable element.

13. The compact camera module of claim 12, wherein the boss is formed from an insulating material and the flexure element is formed from a conductive material.

14. The compact camera module of claim 12, wherein the first roughened surface defines a first pattern and the second roughened surface defines a second pattern.

15. The compact camera module of claim 12, wherein the boss is stationary relative to the module housing and the flexure element is configured to move relative to the module housing.

16. The compact camera module of claim 12, wherein the boss extends from a surface of a carrier supporting a lens aligned with and positioned over the image sensor.

17. A compact camera module comprising:
- a module housing enclosing an interior volume;
- a suspension arrangement comprising a carrier supporting a lens, the suspension arrangement comprising:
  - a first flexure element within the interior volume and comprising a first roughened surface;
  - a first boss disposed within the interior volume and configured to engage with the first roughened surface, wherein the first roughened surface is continuous;
  - a second flexure element within the interior volume and comprising a second roughened surface;
  - a second boss disposed within the interior volume and configured to engage with the second roughened surface; and
- an image sensor disposed within the interior volume, the image sensor positioned below the lens.

18. The compact camera module of claim 17, wherein the first roughened surface is localized to a flexure pad of the first flexure element, the flexure pad aligned to engage with the first boss.

19. The compact camera module of claim 17, wherein the first and second roughened surfaces are formed in a same process.

20. The compact camera module of claim 17, wherein at least one of the first and second roughened surfaces comprise a pattern.

* * * * *